UNITED STATES PATENT OFFICE.

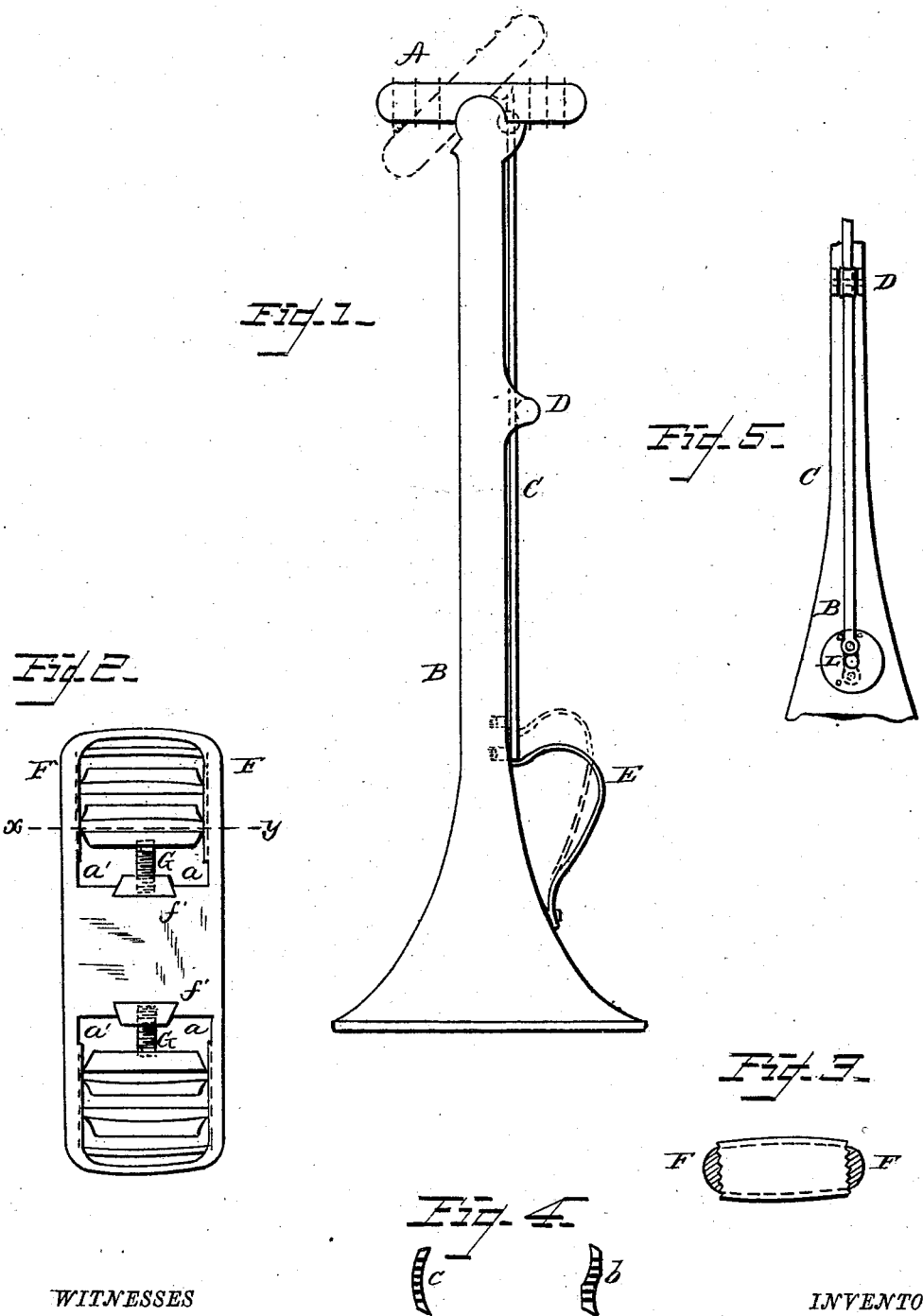

WILLIAM H. MILLER, OF WORCESTER, MASSACHUSETTS.

PEG-FLOAT.

SPECIFICATION forming part of Letters Patent No. 275,687, dated April 10, 1883.

Application filed September 23, 1882. (No model.)

*To all whom it may concern:*

Be it known that I, WILLIAM H. MILLER, of the city and county of Worcester, State of Massachusetts, have invented a new Pegging-Float, of which the following is a specification.

Its object is to hold the knives securely with convenient means of setting, vertical adjustment, and removal for sharpening.

Its nature is fully shown in the accompanying drawings and description of a machine embodying my invention.

In said drawings, Figure 1 is a side view with the head A in position, the broken lines showing it set for cutting toe-pegs. Fig. 2 is a top view, on a larger scale, of the head and knives. Fig. 3 is a cross-section on line $x\,y$ of Fig. 2, and Figs 4 and 5 show some parts hereinafter more particularly described.

A is the head, supported by and pivoted to the stand B, so as to turn to the two positions shown, and be firmly held in either by the rod C, which is attached to the head and extends down below the guide D, and has its lower end turned at right angles, or otherwise fitted to catch on or in the standard B, the spring of the rod C allowing its lower end to be pulled out to release it, yet holding it when in place, and the spring E raising it when free; or the plan shown in Fig. 5 may be used, where the end of rod C is pivoted to the plate L, and by turning the plate L half round the pivot is brought over or under the center of plate L, and will be securely held by it in either position. With either plan the head can be quickly changed without removing the boot or shoe. The peculiar construction of the head A and knives for the purpose of holding and setting them is shown in Figs. 2, 3, and 4. The cavity in the head A, I make with the sides F F finely ribbed, as shown in Fig. 3, with the ends of the knives and followers made to fit, these ribs stopping a short distance from the back end of each side, leaving room for inserting the knives and followers, as at $a\,a'$.

At $f'$ is a removable nut, dovetailed, as shown, into A, and having a screw, G, to be screwed out to press against the last follower (which has a slight cavity for its end) and hold the knives firmly in place, the ribs forming an easy means of setting the knives and adjusting their positions vertically, and a sure one of holding them, effectually preventing them being pressed down in use; yet when the screw is loosened all can be removed for sharpening, or the nut and screw removed, the followers slid back, and the knives be released by turning obliquely, and reversed or set, as desired.

Knives of various forms may be used. I prefer that shown at $b$, or the S form, sharpened on both edges, so as to be reversible, as it works safely in the toe without danger of cutting the upper, while for the heel or shank the cap form $b'$ or other forms may be used. The followers $d$ are placed between the knives, being made with lips at their ends to leave space between them and the following knife for chips to fall through, and the ribs on F F stop short of the outer end, so that the first knife has a space in front for the same purpose, and the last follower, $d'$, is made without lips and a little thicker, with a slight cavity for the end of the screw, as before explained.

What I claim as new, and desire to patent, is—

In a pegging-float, the head A, having its sides made with a series of ribs, as described, in combination with a knife or knives whose ends have corresponding ribs, whereby they may be vertically adjusted and held, and a suitable means for retaining all parts in place, substantially as described.

WM. H. MILLER.

Witnesses:
KELO WANN,
J. G. ARNOLD.